United States Patent
Kwon et al.

(10) Patent No.: US 10,773,199 B2
(45) Date of Patent: Sep. 15, 2020

(54) AIR CONDITIONER AND CONTROL METHOD THEREFOR

(71) Applicant: Samsung Electronics Co., Ltd., Suwon-si (KR)

(72) Inventors: Jun Hyoun Kwon, Seoul (KR); Jung Ho Kim, Suwon-si (KR); Seong Ryeol Myeong, Suwon-si (KR); Baek Youn, Yongin-si (KR); Gwan Taek Kim, Siheung-si (KR); Dae Yeon Kim, Yeosu-si (KR); Mu Jung Kim, Ulsan (KR); Tae Wi Kim, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 243 days.

(21) Appl. No.: 15/760,174

(22) PCT Filed: Sep. 6, 2016

(86) PCT No.: PCT/KR2016/009968
§ 371 (c)(1),
(2) Date: Mar. 14, 2018

(87) PCT Pub. No.: WO2017/047964
PCT Pub. Date: Mar. 23, 2017

(65) Prior Publication Data
US 2018/0250622 A1     Sep. 6, 2018

(30) Foreign Application Priority Data
Sep. 14, 2015   (KR) ................. 10-2015-0129643

(51) Int. Cl.
*B01D 46/00*   (2006.01)
*B01D 46/44*   (2006.01)
*B01D 46/42*   (2006.01)

(52) U.S. Cl.
CPC ......... *B01D 46/0086* (2013.01); *B01D 46/00* (2013.01); *B01D 46/42* (2013.01); *B01D 46/44* (2013.01); *B01D 2279/50* (2013.01)

(58) Field of Classification Search
CPC .... B01D 46/00; B01D 46/0086; B01D 46/44; B01D 46/444; B01D 46/446; B01D 2279/50; B01D 46/42; F24F 11/39
See application file for complete search history.

(56) References Cited

U.S. PATENT DOCUMENTS

2011/0185895 A1* 8/2011 Freen ................ B01D 46/42
                                                    95/25

FOREIGN PATENT DOCUMENTS

CN    1994522 A     7/2007
CN    102860148 A   1/2013
(Continued)

OTHER PUBLICATIONS

International Search Report dated Dec. 20, 2016 in connection with International Patent Application No. PCT/KR2016/009968.
(Continued)

*Primary Examiner* — Robert Clemente

(57) ABSTRACT

Disclosed are an air conditioner and a control method therefor. The air conditioner includes: a main body; a filter configured to filter impurities externally introduced into the main body; a fan configured to introduce the impurities into the main body through the filter; a sensor configured to detect a filter state value for determining a state of the filter; and a processor configured to determine that a replacement time of the filter arrives when an impurity purification capacity calculated on the basis of the filter state value detected in real time by the sensor is lower than a reference value.

18 Claims, 12 Drawing Sheets

(56) References Cited

FOREIGN PATENT DOCUMENTS

| | | |
|---|---|---|
| CN | 203949704 U | 11/2014 |
| CN | 104266324 A | 1/2015 |
| KR | 10-1996-0029729 A | 8/1996 |
| KR | 10-2004-0096833 A | 11/2004 |
| KR | 10-2007-0072787 A | 7/2007 |
| KR | 10-0819077 B1 | 4/2008 |
| WO | 2014/185701 A1 | 11/2014 |

OTHER PUBLICATIONS

Written Opinion of the International Searching Authority dated Dec. 20, 2016 in connection with International Patent Application No. PCT/KR2016/009968.

China National Intellectual Property Administration, "The First Office Action," Application No. CN 201680052956.3, dated Aug. 14, 2019, 19 pages.

Office Action dated Mar. 30, 2020 in connection with Chinese Patent Application No. 201680052956.3, 9 pages.

Office Action dated Jun. 9, 2020 in connection with India Patent Application No. 201817008610, 6 pages.

\* cited by examiner

AIR CONDITIONER AND CONTROL METHOD THEREFOR

CROSS-REFERENCE TO RELATED APPLICATIONS AND CLAIM OF PRIORITY

The present application is a 371 National Stage of International Application No. PCT/KR2016/009968 filed Sep. 6, 2016, which claims the benefit of Korean Patent Application No. 10-2015-0129643 filed Sep. 14, 2015, the contents of which are incorporated herein by reference.

TECHNICAL FIELD

The present disclosure relates to an air conditioner and a method of controlling the same.

BACKGROUND

Generally, an air purifier suctions polluted air from an indoor space, filters dust, odor particles, and the like contained in the air using a filter to purify the air, and discharges the purified air to the outside of the air purifier through an outlet thereof.

Further, the air purifier includes various filters installed to purify introduced air including various sizes of dust particles, odor particles, harmful gas, and the like.

Meanwhile, when dust is accumulated on the filter of the air purifier, dust collection performance is degraded, and thus air purification performance is also degraded.

To prevent the degradation of air purification, a method in which the air purifier notifies of a filter replacement time on the basis of an accumulated use time or a user directly checks a state of a filter and replaces the filter is used.

However, the above-described filter replacement method has problems. When the air purifier is located in a relatively less polluted place, the air purifier notifies of a replacement of a filter even though the filter replacement time has not arrived. When the air purifier is located in a relatively more polluted place, the replacement notification of the filter is delayed even through the filter replacement time has elapsed.

Further, when a user directly and visually checks a state of a filter and replaces the filter, it is hard for the user to accurately determine a time at which the filter should be replaced even though dust is accumulated on the filter.

Therefore, a technology of more accurately providing a filter replacement time of an air purifier is required.

SUMMARY

Provided are an air conditioner capable of estimating a replacement time of a filter on the basis of a relational equation of a filter lifetime and a filter state value measured when the filter is initially used in the air conditioner, and providing an accurate filter replacement time using a real time filter state value and the estimated filter replacement time, and a method of controlling the same.

In accordance with one aspect of the present disclosure, an air conditioner includes: a main body; a filter configured to filter impurities externally introduced into the main body; a fan configured to introduce the impurities into the main body through the filter; a sensor configured to detect a filter state value for determining a state of the filter; and a processor configured to determine that a replacement time of the filter arrives when an impurity purification capacity calculated on the basis of the filter state value detected in real time by the sensor is lower than a reference value, wherein the reference value is calculated on the basis of an initial state value of the filter detected by the sensor.

The air conditioner may further include; a fan motor configured to drive the fan, wherein the initial state value of the filter includes a current and a voltage input to the fan motor.

The processor calculates an initial amount of power consumption of the fan motor on the basis of an initial current and voltage input to the fan motor, and sets an impurity purification capacity at a point of time at which a calculated initial amount of power consumption of the fan motor and the initial state value of the filter are detected as an initial setting value of the filter.

The impurity purification capacity (Y) is calculated on the basis of $Y=Ax^2+Bx+C$, wherein x represents a current amount of power consumption relative to the initial setting value of the filter, A represents whether the impurity purification capacity is increased or decreased corresponding to an increase and a decrease of the amount of power consumption, B presents an instantaneous change rate of the impurity purification capacity when the amount of power consumption is 0, and C represents the impurity purification capacity when the impurity purification capacity is 0.

The initial state value of the filter is a wind velocity on an outlet side.

The processor calculates an air flow on the basis of the wind velocity on the outlet side and sets the impurity purification capacity at a point of time at which the calculated air flow and the initial state value of the filter are detected as an initial setting value of the filter.

The impurity purification capacity (Y) is calculated on the basis of $Y=DE+F$, wherein D represents a ratio of a change in the impurity purification capacity to a change in the air flow, E represents a current air flow relative to the initial setting value of the filter, and F represents the impurity purification capacity when the air flow is 0.

The initial state value of the filter is a differential pressure before and after the filter on a route to which the impurities are introduced.

The processor calculates a pressure loss rate on the basis of the differential pressure before and after the filter, and sets the impurity purification capacity at a point of time at which the calculated pressure loss rate and the initial state value of the filter are detected as an initial setting value of the filter.

The impurity purification capacity (Y) is calculated on the basis of $Y=GH^I$, wherein G represents a ratio of a change in an impurity purification capacity logarithm value to a change in a pressure loss rate logarithm value, H represents a current pressure loss rate relative to the initial setting value of the filter, and I represents the impurity purification capacity when the pressure loss rate logarithm value is 0.

In accordance with one aspect of the present disclosure, a method of controlling an air conditioner, the method includes: detecting, by the air conditioner, an initial state value of a filter through a sensor; setting an initial setting value of the filter on the basis of the initial state value of the filter detected by the sensor; detecting a current state value of the filter through the sensor in real time; checking whether an impurity purification capacity calculated on the basis of the detected current state value of the filter is lower than a reference value; and outputting a filter replacement notification by determining that a replacement time of the filter arrives when the impurity purification capacity is lower than the reference value as a result of the checking, wherein the reference value is calculated on the basis of the initial state value of the filter detected by the sensor.

The method may further include: before the detecting of a current state value of the filter in real time and after the setting of an initial setting value, determining a reference value by which the impurity purification capacity is reduced from the initial setting value of the filter as a filter replacement time.

The initial state value of the filter includes a current and a voltage input to a fan motor.

The setting of the initial setting value of the filter includes: calculating an amount of power consumption of the fan motor on the basis of the current and the voltage input to the fan motor; and setting an impurity purification capacity at a point of time at which the initial state value of the filter and the calculated amount of power consumption of the fan motor are detected as the initial setting value of the filter.

The impurity purification capacity (Y) is calculated on the basis of $Y=Ax^2+Bx+C$, wherein x represents a current amount of power consumption in comparison to the initial setting value of the filter, A represents whether the impurity purification capacity is increased or decreased corresponding to an increase and a decrease of the amount of power consumption, B presents an instantaneous change rate of the impurity purification capacity when the amount of power consumption is 0, and C represents the impurity purification capacity when the impurity purification capacity is 0.

The initial state value of the filter is a wind velocity on an outlet side.

The setting of the initial setting value of the filter includes: calculating a wind velocity on the basis of the wind velocity on the outlet side; and setting an impurity purification capacity at a point of time at which the calculated wind velocity and the initial state value of the filter are detected as the initial setting value of the filter.

The impurity purification capacity (Y) is calculated on the basis of $Y=DE+F$, wherein D represents a ratio of a change in the impurity purification capacity to a change in an air flow, E represents a current air flow relative to the initial setting value of the filter, and F represents the impurity purification capacity when the air flow is 0.

The initial state value of the filter is a differential pressure before and after the filter on a route to which impurities are introduced.

The setting of the initial setting value of the filter includes: calculating a pressure loss rate on the basis of the differential pressure before and after the filter; and setting the impurity purification capacity at a point of time at which the calculated pressure loss rate and the initial state value of the filter are detected as the initial setting value of the filter.

The impurity purification capacity (Y) is calculated on the basis of $Y=GH^I$, wherein G represents a ratio of a change in an impurity purification capacity logarithm value to a change in a pressure loss rate logarithm value, H represents a current pressure loss rate relative to the initial setting value of the filter, and I represents the impurity purification capacity when the pressure loss rate logarithm value is 0.

In accordance with another aspect of the present disclosure, an air conditioner includes: a main body; a filter configured to filter impurities externally introduced into the main body; a fan configured to introduce the impurities into the main body through the filter; a fan motor configured to drive the fan; a processor determining that the replacement time of the filter arrives when an impurity purification capacity calculated in real time on the basis of the input value applied to the fan motor is lower than a reference value; wherein the reference value may be calculated on the basis of an initial input value applied to the fan motor when the filter is initially operated.

The initial input value may be a current and a voltage applied to the fan motor.

The processor may calculate an initial amount of power consumption of the fan motor on the basis of the initial current and voltage input to the fan motor, and may set the calculated initial amount of power consumption of the fan motor and an impurity purification capacity at a point of time at which the initial input value is applied to the fan motor as an initial setting value of the filter when the filter is initially operated.

The impurity purification capacity (Y) is calculated on the basis of $Y=Ax^2+Bx+C$, wherein x represents a current amount of power consumption relative to the initial setting value of the filter, A represents whether the impurity purification capacity is increased or decreased corresponding to an increase and a decrease of the amount of power consumption, B presents an instantaneous change rate of the impurity purification capacity when the amount of power consumption is 0, and C represents the impurity purification capacity when the impurity purification capacity is 0.

The present disclosure has an effect of providing a more reliable filter replacement notification by measuring a physical amount applied to an air conditioner at a point of time at which an air conditioner is initially used or a filter is initially replaced, estimating a filter replacement time through a lifetime relational equation and the measured value, and checking a filter state value in real time using the estimated filter replacement time.

DETAILED DESCRIPTION

Figure 1:
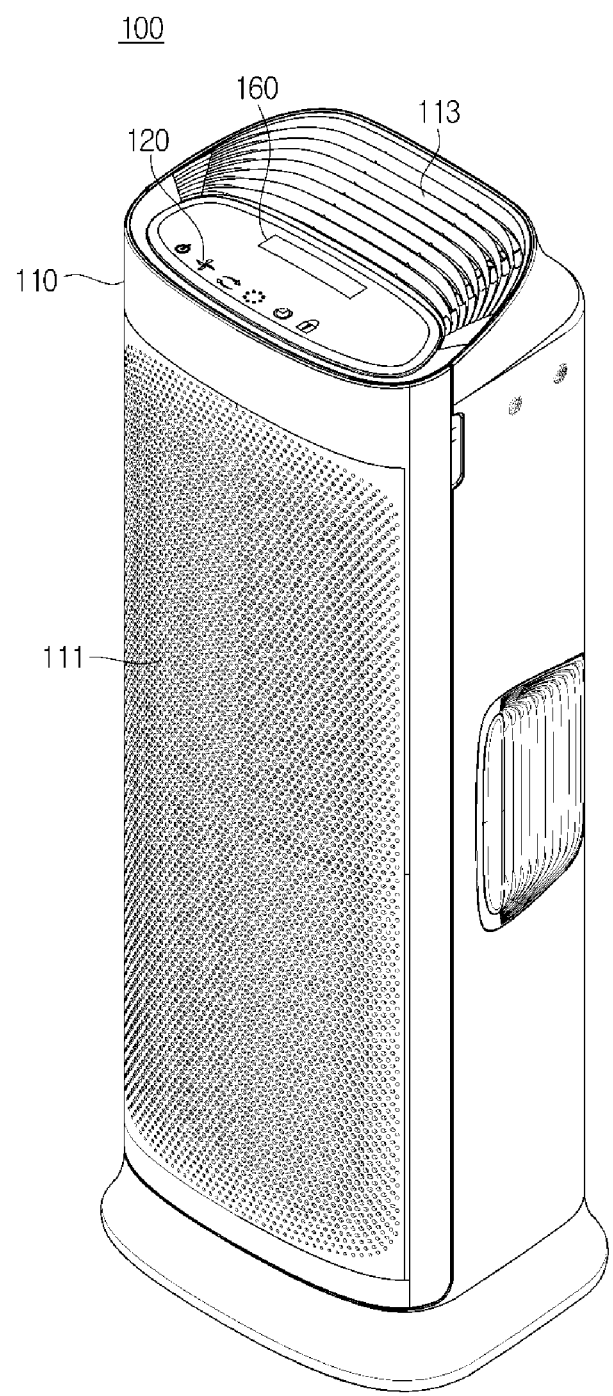
FIG. 1 is a view showing an exterior of an air conditioner.

Purposes, specific advantages, and novel features of the present disclosure will be made clear from exemplary embodiments and the following detailed descriptions in connection with the accompanying drawings. In this specification, it should be noted that the same reference numerals may be assigned to the same components in different drawings whenever possible. When detailed descriptions of related well-known technology are deemed to unnecessarily obscure the gist of the present disclosure, they will be omitted. In this specification, although the terms first, second, and the like are used to distinguish one component from another component, the components are not limited by the terms.

Hereinafter, various embodiments of the present disclosure will be described in detail with reference to the accompanying drawings.

Figure 2:
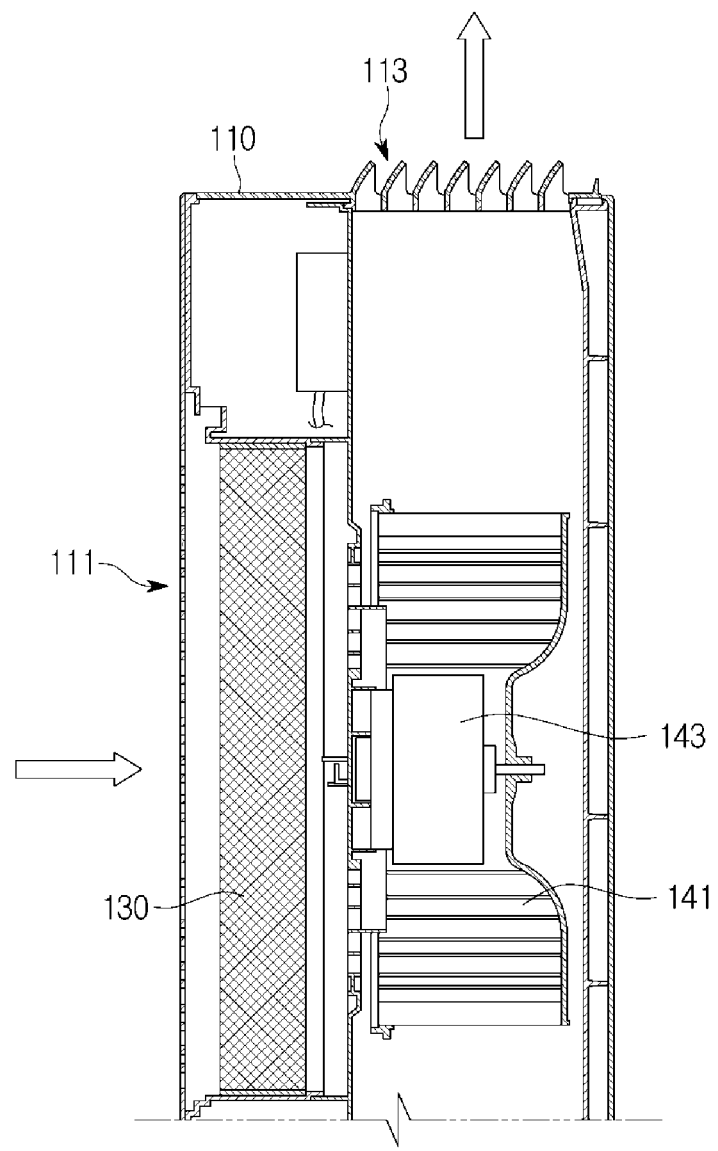
FIG. 2 is a view showing an inside of the air conditioner.

FIG. 1 is a view showing an exterior of an air conditioner, and FIG. 2 is a view showing an inside of the air conditioner.

As shown in FIG. 1, an air conditioner 100 may include a main body 110 configured to form an exterior thereof, an inlet 111 through which air is suctioned from an indoor space, an outlet 113 through which introduced and purified air is discharged, an inputter 120, and a display 160 for displaying an operating state of the air conditioner 100.

The air conditioner disclosed in the present disclosure is defined as any device having a function of purifying air with a fan and a fan motor, including an air purifier and an air conditioner.

The inputter 120 may include buttons for inputting various types of control information related to the air conditioner 100, such as a power button for turning the air conditioner 100 on or off, a timer button for setting an operation time of the air conditioner 100, and a locking button for limiting an operation of the inputter to prevent a malfunction of the inputter. In this case, each of the input buttons may use a push switch and a membrane switch using a method of generating an input signal through a physical pressure of a user, or a touch switch generating an input signal through a touch of a part of the user's body.

When the inputter 120 uses the touch switch method, the inputter 120 may be integrally provided with the display 160.

As shown in FIG. 2, the main body 110 of the air conditioner 100 may include a filter 130, a fan 141, and a fan motor 143.

The filter 130 may have a configuration for filtering impurities introduced into the main body 110 from the outside.

In this case, the impurities may include any component which may be a cause of air pollution included in air, such as various sized of dust particles including fine dust, a harmful gas, an odor particle causing a bad smell, and the like.

The fan 141 may have a configuration for introducing impurities into the main body 110 through the filter 130.

The fan motor 143 may have a configuration for operating the fan 141.

The air conditioner 100 allows air in an indoor space to be introduced into the main body 110 through the inlet 111 by operating the fan 141 using the fan motor 143.

In this case, as shown in FIG. 2, air introduced into the inlet 111 passes through the filter 130, and impurities in the air are filtered by the filter 130.

In the disclosed disclosure, a filter replacement time may be estimated on the basis of a physical amount detected to recognize a state of the filter 130. This will be described in more detail below.

Figure 3:
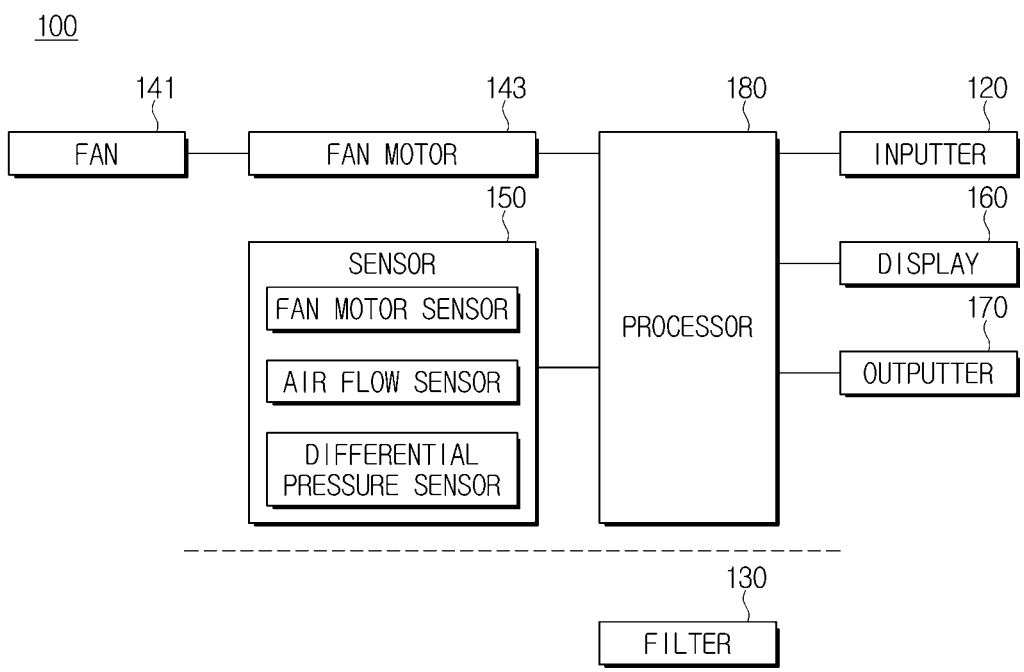
FIG. 3 is a view showing one embodiment of the air conditioner in detail.

FIG. 3 is a view showing one embodiment of the air conditioner in detail.

Descriptions of components, which are identical to the components disclosed in FIGS. 1 to 2, among the below-described components of the air conditioner will be omitted.

Figure 9:
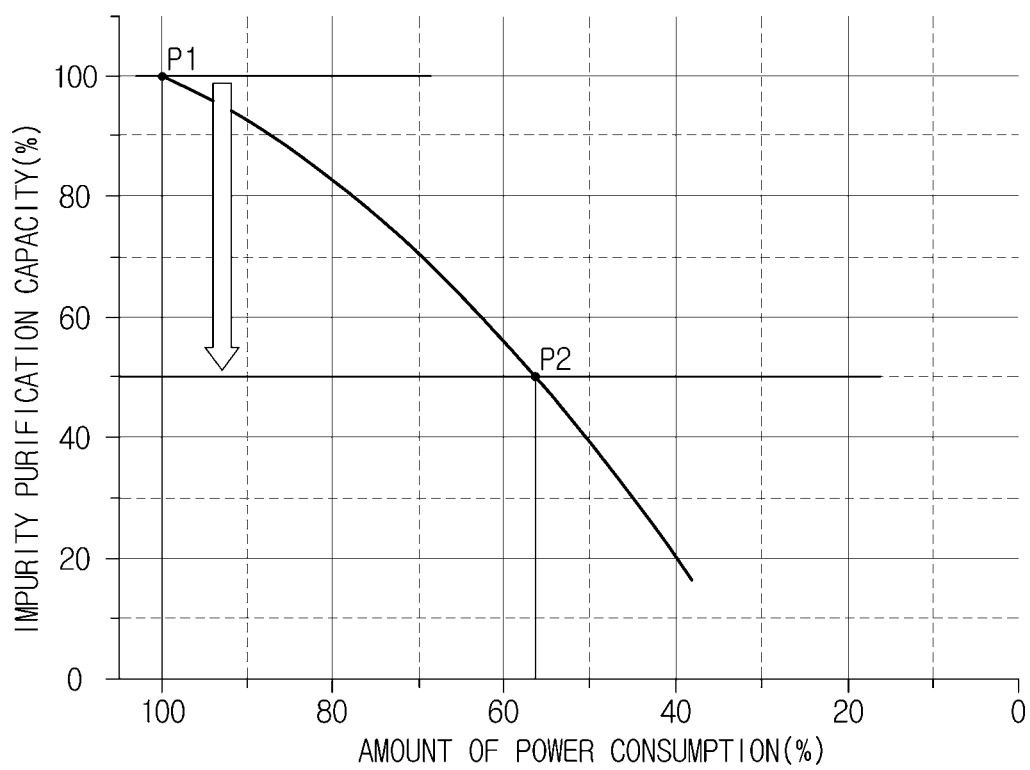
FIG. 9 is a view showing a graph for describing a method of controlling an air conditioner according to a first embodiment.
Figure 10:
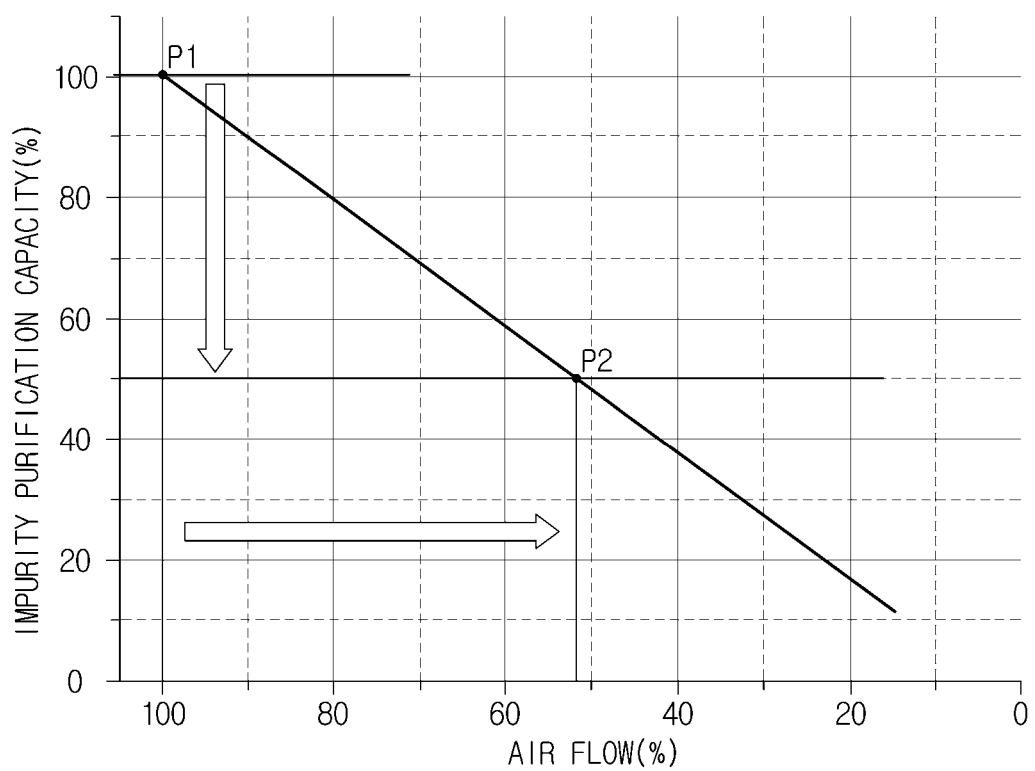
FIG. 10 is a view showing a graph for describing a method of controlling an air conditioner according to a second embodiment.
Figure 11:
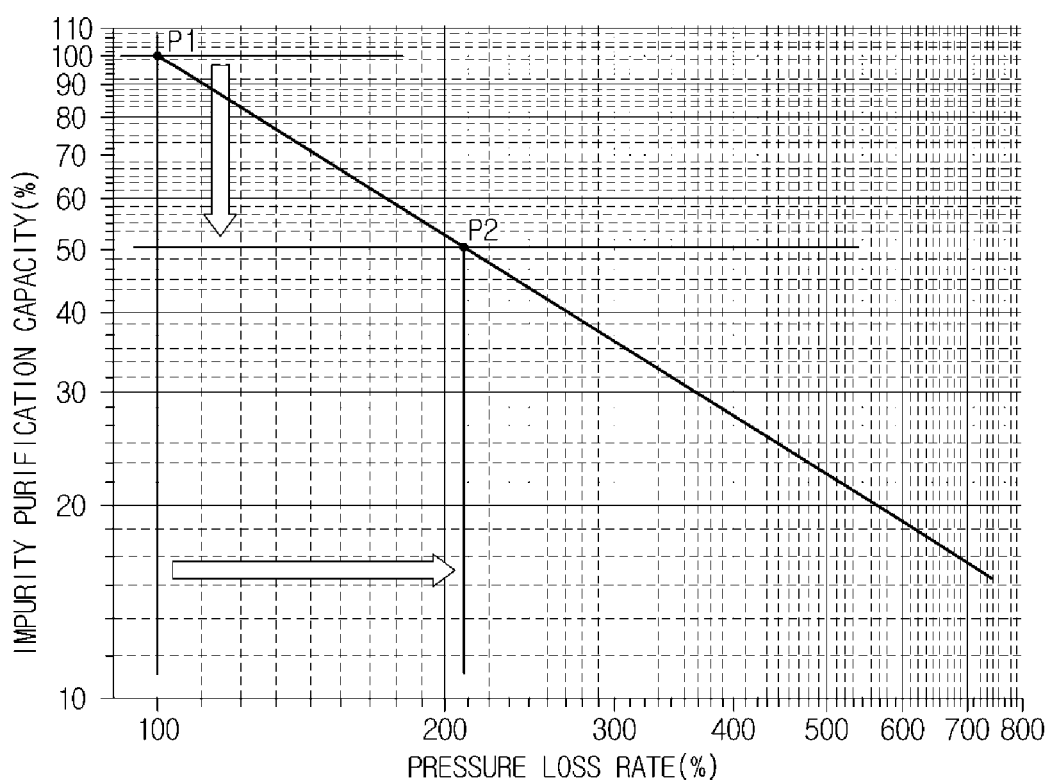
FIG. 11 is a view showing a graph for describing a method of controlling an air conditioner according to a third embodiment.

Further, the air conditioner will be described with reference to FIG. 9 showing a graph for describing a method of controlling an air conditioner according to a first embodiment, FIG. 10 showing a graph for describing a method of controlling an air conditioner according to a second embodiment, and FIG. 11 showing a graph for describing a method of controlling an air conditioner according to a third embodiment.

As shown in FIG. 3, the air conditioner 100 may include the inputter 120, the filter 130, the fan 141, the fan motor 143, the sensor 150, the display 160, an outputter 170, and a processor 180.

More specifically, the filter 130 may have a configuration for filtering impurities introduced into the main body 110 from the outside. In this case, a plurality of filters 130 may be provided to filter various sizes of dust particles including fine dust, a harmful gas, and a bad smell. For example, the filter 130 may include a fine filter for removing relatively large dust particles, a charcoal deodorizing filter for removing a harmful gas and a bad smell, and a high efficiency particulate air (HEPA) filter for removing ultra-fine dust.

The fan 141 may have a configuration for introducing the impurities into the main body through the filter 130. That is, the fan 141 forms a path so that air dispersed in an indoor space flows in a direction of the air conditioner 100 to introduce the air into the main body 110.

The fan motor 143 may have a configuration for operating the fan 141.

The sensor 150 may have a configuration for detecting a filter state value for measuring a state of the filter.

Particularly, the sensor 150 may detect at least one among a current and a voltage input to the fan motor 143, a wind velocity on an outlet side, and a differential pressure before and after the filter on a route to which the impurities are introduced. In this case, the differential pressure before and after the filter may be a difference between a suction pressure of introduced air and an exhaust pressure of air discharged through the filter 130 with respect to the filter 130.

To this end, the sensor 150 may include a fan motor sensor, a wind velocity sensor, and a differential pressure sensor. In this case, the fan motor sensor may be provided at a position for measuring a current and a voltage input to or output from the fan motor 143.

Further, the wind velocity sensor is provided adjacent to the outlet 113 through which purified air is discharged to the outside to detect a wind velocity on the outlet side.

Figure 4:
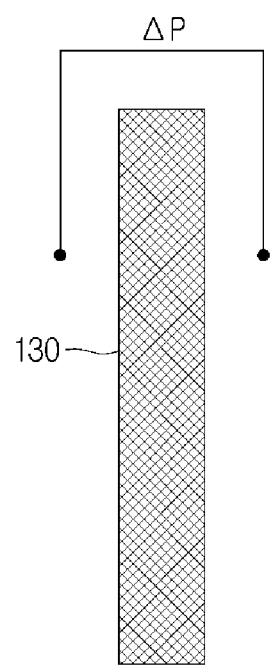
FIG. 4 is a view for explaining a method of detecting a differential pressure.

As shown in FIG. 4, the differential pressure sensor may detect a differential pressure ($\Delta P$) before and after the filter 130 on a route into which the impurities are introduced.

The inputter 120 may be provided at the outside of the air conditioner 100 to receive various control commands from a user. In this case, each of the input buttons of the inputter 120 may be a push switch and a membrane switch using a method of generating an input signal through a physical press of the user, or a touch switch of generating an input signal through a touch of a part of the user's body.

The display 160 having a configuration for displaying an operating state of the air conditioner 100 may display a filter replacement notification in the disclosed disclosure, but is not limited thereto.

The outputter 170 having a configuration for displaying the operating state of the air conditioner 100 as a sound may output a filter replacement time notification in the form of a guide voice, a melody, and the like, but is not limited thereto.

The processor 180 may provide the filter replacement notification through the display 160 or the outputter 170 by determining a replacement time of the filter when an impurity purification capacity calculated on the basis of the filter state value detected in real time by the sensor 150 is lower than a standard value.

In this case, the impurity purification capacity refers to performance of the filter 130 filtering impurities in air introduced into the main body 110, and the impurity purification capacity at a time at which an initial state value of the filter is detected may be set to 100%.

Further, the above-described reference value, which is calculated on the basis of the initial state value of the filter detected by the sensor 150, will be described below in detail.

The processor 180 may set an initial setting value using the initial state value of the filter detected by the sensor 150 and an impurity purification capacity calculated on the basis of the initial state value of the filter.

Further, the processor 180 may estimate the replacement time of the filter on the basis of the set initial setting value of the filter and output a filter replacement notification when the impurity purification capacity calculated on the basis of the current state value of the filter detected by the sensor 150 is lower than a reference value, which is the replacement time of the filter.

First, when initial state values of the filter indicate a current and a voltage input to the fan motor, the processor 180 may calculate an amount of power consumption of the fan motor 143 on the basis of an initial current and voltage input to the fan motor 143, and set, as initial setting values of the filter, an impurity purification capacity at a point of time at which the calculated initial amount of power consumption of the fan motor 143 and the initial state values of the filter are detected.

The initial setting value of the filter may be defined as an initial value at the time of an initial operation in consideration of deviations of the filter and a set practically applied to the filter.

In this case, since the initial setting value includes the impurity purification capacity calculated on the basis of the initial state value of the filter, the initial setting value may be used as a starting point for measuring a filter replacement time (for example, an impurity purification capacity of 100% P1 shown in FIG. 9) even when the filter replacement time is determined due to a low impurity purification capacity.

An impurity purification capacity Y may be calculated through Equation 1. In this case, Equation 1 represents a relational equation between an impurity purification capacity change and an amount of change in power consumption. That is, Y in Equation 1 represents an impurity purification capacity changed depending on the amount of change in power consumption.

$$Y = Ax^2 + Bx + C \quad \text{[Equation 1]}$$

Here, x represents a current amount of power consumption [%] relative to the initial setting value of the filter, A represents whether the impurity purification capacity is increased or decreased corresponding to an increase and decrease in the amount of power consumption [%], B represents an instantaneous rate of change of the impurity purification capacity when the amount of power consumption is 0, and C represents the impurity purification capacity when the impurity purification capacity is 0.

In this case, A is greater than 0 (A>0), a direction of change of the amount of power consumption is different from a direction of change of the impurity purification capacity. When A is less than 0 (A<0), the direction of change of the amount of power consumption may be the same as the direction of change of the impurity purification capacity.

Referring to FIG. 9, as an absolute A (|A|) increases, a change in the amount of power consumption decreases and a change in the impurity purification capacity increases.

The processor 180 may estimate a replacement time of the filter when the impurity purification capacity is lower than a reference value (for example, 50%) relative to the initial setting value of the filter.

As shown in FIG. 9, the processor 180 sets 100% P1 shown in FIG. 9, the impurity purification capacity, and the amount of power consumption of the fan motor obtained using the initial state value of the filter detected as the initial setting value of the filter when the filter 130 is replaced or the air conditioner 100 is initially used. An X axis of FIG. 9 may be an amount of power consumption of the fan motor, and a Y axis may be an impurity purification capacity.

The initial setting value of the filter is defined as an initial value at the time of an initial operation in consideration of deviations of the filter and the set applied to the filter.

Further, the processor 180 sets a point of time at which the impurity purification capacity is reduced until filter replacement is required, for example, the point of time at which the impurity purification capacity is reduced by 50%, P2 of FIG. 9 as a reference value for determining the replacement time of the filter on the basis of the relational equation (Equation 1) between a change in the amount of power consumption of the fan motor 143 and a change in the impurity purification capacity.

The processor 180 recognizes a current state value of the filter by detecting a current and a voltage applied to the fan motor in real time, and determines that the filter replacement time arrives when the impurity purification capacity calculated on the basis of the current state value is lower than the reference value.

Referring to FIG. 9, the processor 180 may determine that the replacement time of the filter arrives when the current amount of power consumption of the fan motor deviated on the basis of the current state value of the filter detected in real time is less than or equal to the amount of power consumption of the fan motor at the filter replacement time, for example, the point of time at which the impurity purification capacity is reduced by 50%.

That is, the processor 180 determines that the filter replacement time arrives when the impurity purification capacity calculated on the basis of the current amount of power consumption of the fan motor is lower than the reference value, and thus outputs a filter replacement notification. In this case, the filter replacement notification may be any one of a voice, text, and a combination thereof.

Second, when the initial state value of the filter is an initial wind velocity on the outlet side, the processor 180 may calculate an air flow on the basis of the initial wind velocity on the outlet side and set the impurity purification capacity at a point of time at which the calculated air flow and the initial state value of the filter are detected.

The impurity purification capacity Y may be calculated through Equation 2. In this case, Equation 2 represents a relational equation between a change in the impurity purification capacity and a change in the air flow. That is, Y in Equation 2 represents an impurity purification capacity changed depending on the change in the air flow.

$$Y = DE + F \quad \text{[Equation 2]}$$

Here, D represents a ratio of a change in the impurity purification capacity [Y, %] to a change in the air flow [%, E], E represents a current air flow relative to the initial setting value of the filter [%], and F represents the impurity purification capacity when the air flow is 0.

Further, the processor 180 may set a point of time at which the impurity purification capacity is reduced to an extend that filter replacement is required (for example, the point of time P2 shown in FIG. 10 at which the impurity purification capacity is reduced by 50%) as a reference value for determining the replacement time of the filter on the basis of the relational equation (Equation 2) between the change in the impurity purification capacity and the change in air flow.

Further, the processor 180 may estimate the replacement time of the filter when the impurity purification capacity is reduced by a reference value (for example, 50%) relative to the initial setting value of the filter.

As shown in FIG. 10, the processor 180 sets each of the impurity purification capacity and an air flow on the outlet side, which are obtained using the initial state value of the filter detected when the filter 130 is replaced or the air conditioner 100 is initially used as the initial setting value of the filter, to 100% P1 shown in FIG. 10. In this case, an X axis may be an air flow on the outlet side, and a Y axis may be the impurity purification capacity.

The initial setting value of the filter is defined as an initial value at a time of an initial operation in consideration of deviations of the filter and the set applied to the filter.

Further, the processor 180 sets the point of time at which the impurity purification capacity is reduced to the extent that filter replacement is required (for example, the point of time at which the impurity purification capacity is reduced by 50% P2 shown in FIG. 10) as the reference value for determining the replacement time of the filter on the basis of the relational equation (Equation 2) between the change in the air flow and the change in the impurity purification capacity.

The processor 180 recognizes a current state value of the filter by detecting the air flow on the outlet side in real time and determines that the replacement time of the filter arrives when the impurity purification capacity calculated on the basis of the current state value is lower than the reference value.

Referring to FIG. 10, when the current air flow calculated on the basis of a wind velocity on the outlet side detected in real time is compared with the air flow at the filter replacement time and the current air flow is less than or equal to the air flow at the filter replacement time, the processor 180 determines that a filter replacement time arrives, and thus may output a filter replacement notification. That is, when the impurity purification capacity is lower than a reference value because impurities are accumulated in the filter so that the air flow is reduced, the processor 180 outputs the filter replacement notification.

Meanwhile, in the above description, although the case in which the air flow is used when it is determined that the filter replacement time arrives has been exemplarily described, embodiments are not limited thereto, and a method of directly using a wind velocity may be used.

Third, when the initial state value of the filter is a differential pressure before and after the filter 130 on the route to which impurities are introduced, the processor 180 may calculate a pressure loss rate on the basis of the initial state value of the filter and set the calculated pressure loss rate and the impurity purification capacity at the time at which the initial state value of the filter is detected as the initial setting value of the filter.

The impurity purification capacity Y may be calculated through Equation 3. In this case, Equation 3 represents a relational equation between a change in the impurity purification capacity and a change in pressure loss rate. That is, Y in Equation 3 represents an impurity purification capacity changed depending on a change in the pressure loss rate.

$$Y = GH^I$$ [Equation 3]

Here, G represents a ratio of the change in an impurity purification capacity logarithm value [H, %] to the change in a pressure loss rate logarithm value [H, %], H represents a current pressure loss rate [%] relative to the initial setting value of the filter, and I represents the impurity purification capacity when the pressure loss rate logarithm value is 0.

As shown in FIG. 11, the processor 180 sets 100% P1 shown in FIG. 11 as the initial setting value of the filter and the impurity purification capacity at a point of time at which a pressure loss rate and the initial state value of the filter obtained using the initial state value of the filter detected when the filter 130 is replaced or the air conditioner 100 is initially used are detected. In this case, the X axis may be a pressure loss rate (%), and the Y axis may be the impurity purification capacity (%).

The initial setting value of the filter is defined as an initial value at a point of time of an initial operation in consideration of deviations of the filter and the set applied to the filter.

Further, the processor 180 sets a point of time at which the impurity purification capacity is reduced to the extent that filter replacement is required (for example, the point of time at which the impurity purification capacity is reduced by 50% P2 shown in FIG. 11) as the reference value for determining the replacement time of the filter on the basis of the relational equation (Equation 3) between the change in the air flow and the change in the impurity purification capacity.

Further, the processor 180 may estimate a pressure loss rate at a point of time at which the impurity purification capacity is reduced by a reference value (for example 50%) relative to the initial setting value of the filter as a pressure loss rate of the filter replacement time.

The processor 180 may determine that the replacement time of the filter arrives when the impurity purification capacity calculated on the basis of a current differential pressure before and after the filter detected in real time is lower than the reference value.

Further, when the current pressure loss rate calculated on the basis of the current differential pressure before and after the filter is compared with the pressure loss rate of the filter replacement time and the current pressure loss rate is greater than or equal to the pressure loss rate of the filter replacement time, the processor 180 may determine that the filter replacement time arrives.

In the above description, the case in which the pressure loss rate is used when it is determined that the filter replacement time arrives has been exemplarily described, but embodiments is not limited thereto. A method of directly using a differential pressure before and after the filter may be used.

Figure 5:
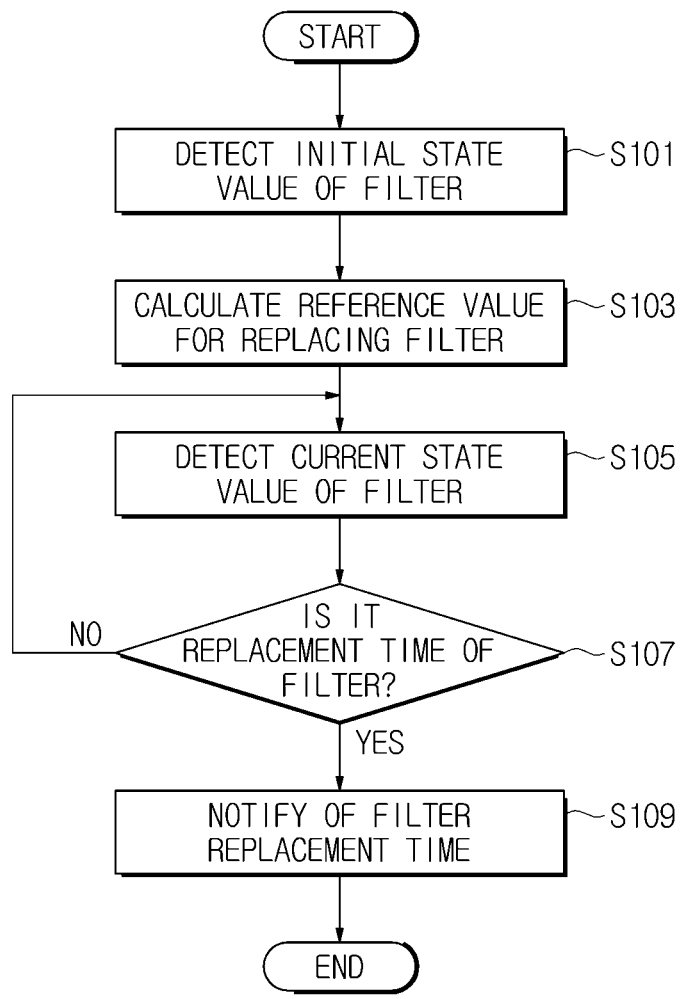
FIG. 5 is a flowchart for describing a method of controlling an air conditioner.

FIG. 5 is a flowchart for describing a method of controlling an air conditioner.

First, the air conditioner 100 may set an initial setting value of the filter by measuring an initial state value of the filter, which is a physical amount related to an operation of the air conditioner 100 at a point of time at which the air conditioner 100 is initially used or a filter 130 is replaced (S101). In this case, the initial state value of the filter represents a detected value detected by the sensor 150, and the initial setting value of the filter represents a setting of a start reference for determining a filter replacement time.

More specifically, the air conditioner 100 detects a current and a voltage input to the fan motor 143 through the sensor 150, a wind velocity on an outlet side, and a difference between a suction pressure and an exhaust pressure, that is, a differential pressure before and after the filter, and may set an impurity purification capacity at a point of time at which the initial state value is detected as an initial setting value of the filter. For example, the initial setting value is 100% P1 disclosed in FIGS. 9 to 11.

The air conditioner 100 may calculate a reference value by which an impurity purification capacity is reduced from the initial setting value of the filter to a filter replacement time (S103).

The air conditioner 100 may receive a current state value of the filter through the sensor 150 in real time (S105).

The air conditioner 100 may determine that the replacement time of the filter arrives by checking whether an impurity purification capacity calculated on the basis of the current state value of the detected filter is lower than the reference value (S107). In this case, the air conditioner 100 may determine that the replacement time of the filter arrives when the impurity purification capacity is lower than the reference value.

When the filter replacement time is determined to arrive, the air conditioner 100 may output a filter replacement notification (S109).

Meanwhile, as the determination result in operation S107, when the filter replacement time does not arrive, the air conditioner 100 may re-perform the operations from operation 105.

Hereinafter, each of a case in which filter state values are a current and a voltage input to the fan motor, a case in which the filter state value is a wind velocity on an outlet side, and a case in which the filter state value is a differential pressure before and after the filter on a route to which impurities are introduced will be exemplarily described.

Figure 6:
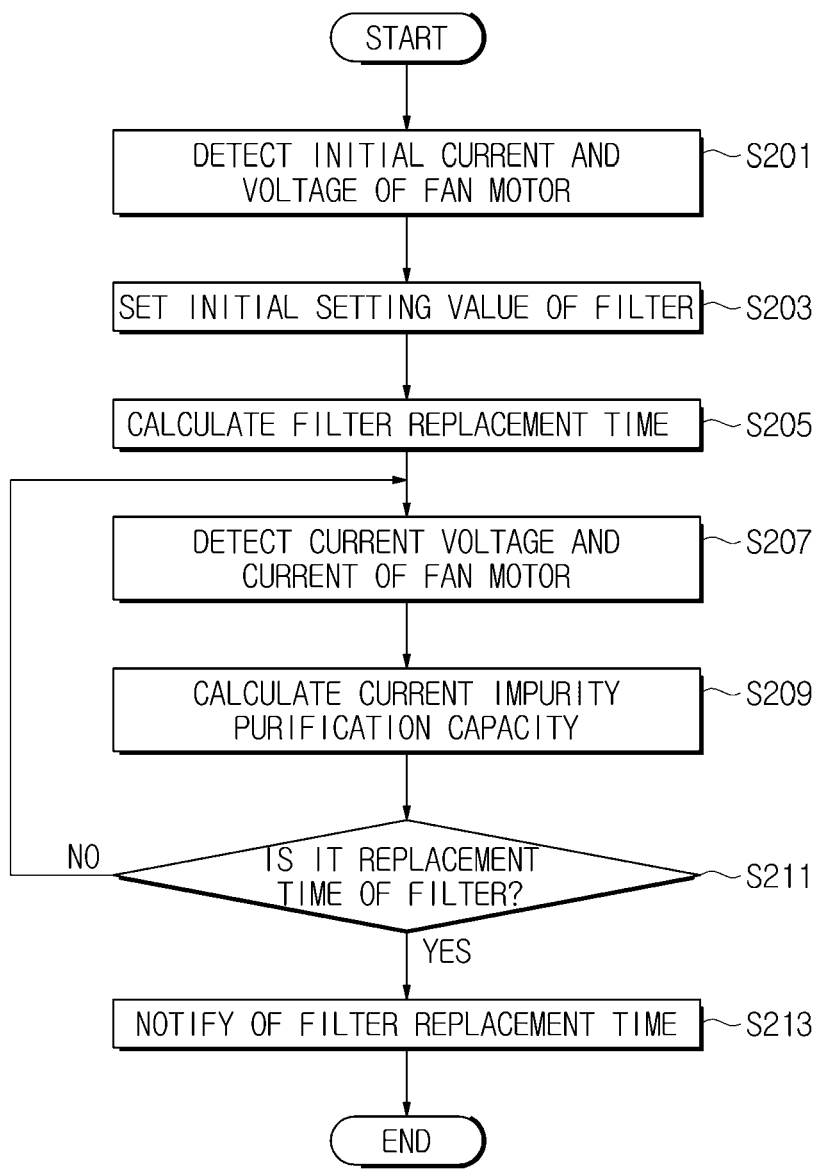
FIG. 6 is a flowchart for describing the method of controlling an air conditioner according to the first embodiment.

FIG. 6 is a flowchart for describing the method of controlling an air conditioner according to the first embodiment, and an example of the case in which the filter state value is the current and the voltage input to the fan motor will be described.

First, the air conditioner 100 may detect an initial current input to the fan motor 143 through the sensor 150 as an initial state value (S201).

Next, the air conditioner 100 may set an initial setting value of the filter on the basis of the initial state value of the filter detected by the sensor 150 (S203).

More specifically, the air conditioner 100 may calculate an initial amount of power consumption of the fan motor on the basis of an initial current and voltage input to the fan motor and set an impurity purification capacity at a point of time at which the calculated initial amount of power consumption of the fan motor and the initial state value of the filter are detected as the initial setting value of the filter.

The impurity purification capacity Y may be calculated through the above described Equation 1. In this case, Equation 1 represents a relational equation between an amount of change in power consumption and a change in the impurity purification capacity. That is, Y in Equation 1 represents an impurity purification capacity changed depending on the amount of change in the power consumption.

The air conditioner 100 may estimate a reference value (for example, 50%) by which an impurity purification capacity is reduced from the initial setting value of the filter as a filter replacement time (S205).

In this case, the air conditioner 100 may estimate an amount of power consumption of the fan motor at a point of time at which the impurity purification capacity is reduced by the reference value relative to the initial setting value of the filter as the filter replacement time.

Next, the air conditioner 100 may receive a current state value of the filter detected by the sensor 150 (S207). That is, the air conditioner 100 may check the current and voltage applied to the fan motor in real time.

The air conditioner 100 may calculate a current impurity purification capacity using the current voltage and current applied to the fan motor 143 (S209).

The air conditioner 100 may determine that the replacement time of the filter arrives by checking whether the current impurity purification capacity is lower than the reference value (S211). The air conditioner 100 determines that the replacement time of the filter arrives when the current impurity purification capacity is lower than the reference value.

When it is determined that the filter replacement time arrives as a result of the determination, the air conditioner 100 may output a filter replacement notification (S213).

Meanwhile, when it is determined that the filter replacement time does not arrive as a result of the determination of operation S211, the air conditioner 100 may re-perform the operations from operation S207.

Figure 7:
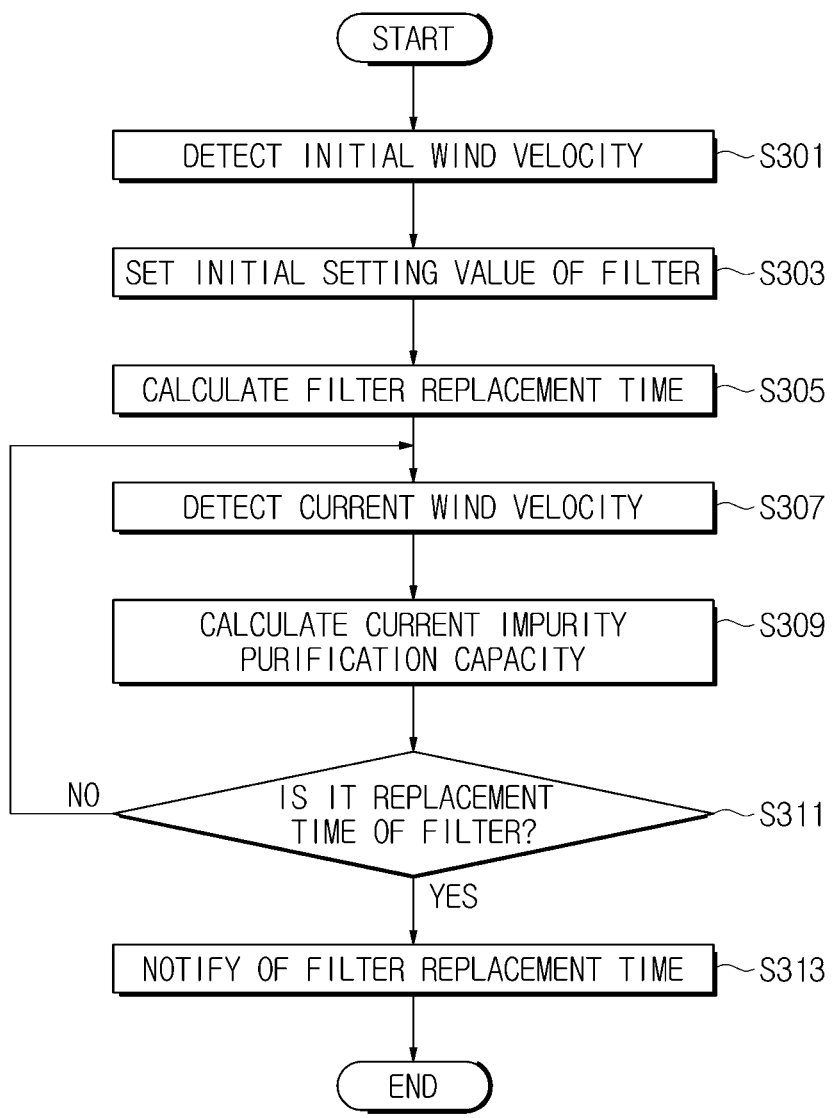
FIG. 7 is a flowchart for describing the method of controlling an air conditioner according to the second embodiment.

FIG. 7 is a flowchart for describing the method of controlling an air conditioner according to the second embodiment, and an example of the case in which the filter state value is the wind velocity on the outlet side will be exemplarily described.

First, the air conditioner 100 may detect an initial wind velocity on the outlet side through the sensor 150 (S301). To this end, a velocity sensor should be provided adjacent to the outlet.

Next, the air conditioner 100 may set an initial setting value of the filter on the basis of the initial state value (the initial wind velocity) of the filter detected by the sensor 150 (S303).

More specifically, the air conditioner 100 may calculate an air flow on the basis of the initial wind velocity on the outlet side and set an impurity purification capacity at a point of time at which the calculated air flow and the initial state value of the filter are detected as the initial setting value of the filter.

The impurity purification capacity Y may be calculated through Equation 2. In this case, Equation 2 represents a relational equation between a change in the impurity purification capacity and a change in the air flow. That is, Y in Equation 2 represents an impurity purification capacity changed depending on the change in the air flow.

The air conditioner 100 may estimate a reference value (for example, 50%) by which the impurity purification capacity is reduced from the initial setting value of the filter, as a filter replacement time (S305).

In this case, the air conditioner 100 may estimate an air flow at a point of time at which the impurity purification capacity is reduced by the reference value relative to the initial setting value of the filter as the filter replacement time.

The air conditioner 100 may detect a current wind velocity through the sensor 150 (S307). That is, the air conditioner 100 may check a wind velocity on the outlet side in real time.

The air conditioner 100 may calculate a current impurity purification capacity on the basis of current wind velocity (S309).

The air conditioner 100 may determine that the replacement time of the filter arrives by checking whether the current impurity purification capacity is lower than the reference value (S311). The air conditioner 100 determines that the replacement time of the filter arrives when the current impurity purification capacity is lower than the reference value.

When it is determined that the filter replacement time arrives as a result of the determination, the air conditioner 100 may output a filter replacement notification (S313).

Meanwhile, when it is determined that the filter replacement time does not arrive as a result of the determination of operation S311, the air conditioner 100 may re-perform the operations from operation S307.

Figure 8:
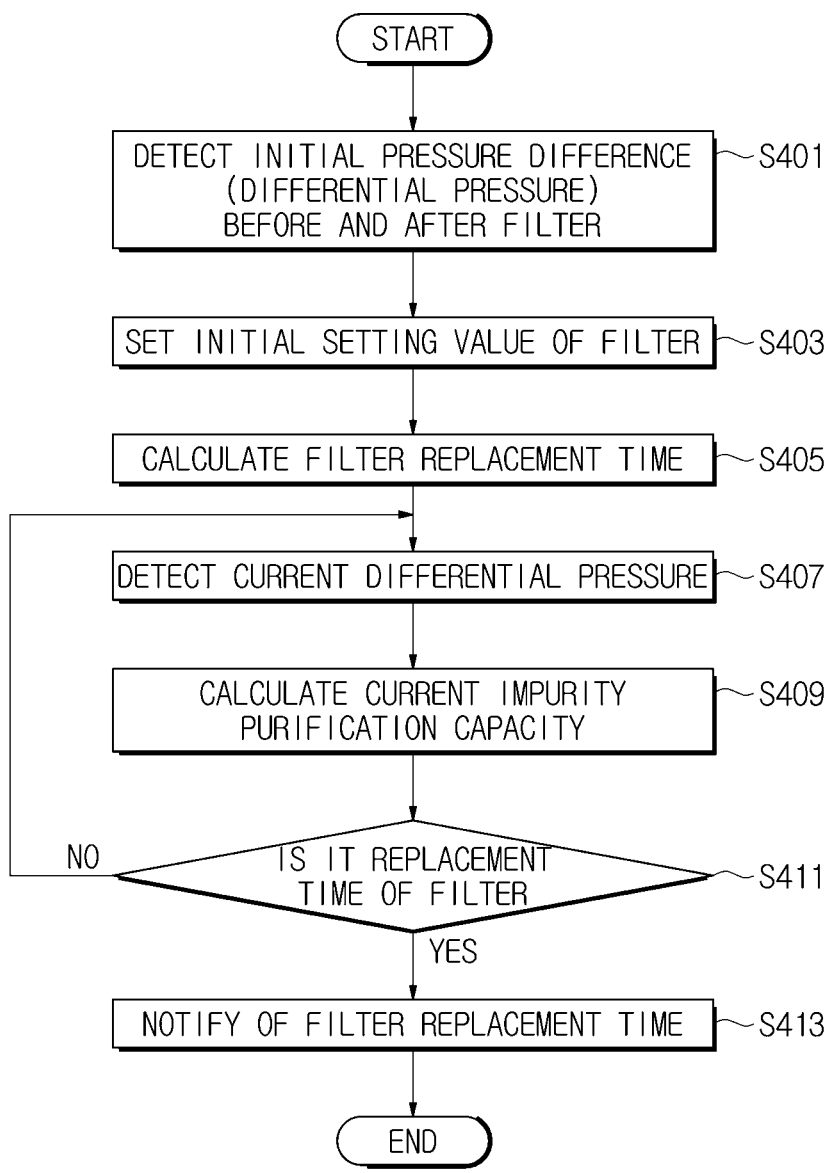
FIG. 8 is a flowchart for describing the method of controlling an air conditioner according to the third embodiment.

FIG. 8 is a flowchart for describing the method of controlling an air conditioner according to the third embodiment.

The air conditioner 100 may detect a differential pressure before and after a filter on a route to which impurities are introduced through the sensor 150 (S401).

The air conditioner 100 may set an initial setting value of the filter on the basis of the differential pressure before and after the filter detected by the sensor 150 (S403).

More specifically, the air conditioner 100 may calculate an initial pressure loss rate on the basis of the differential pressure before and after the filter and set an impurity purification capacity at a point of time at which the calculated pressure loss rate and an initial state value of the filter are detected as the initial setting value.

The impurity purification capacity Y may be calculated through Equation 3. In this case, Equation 3 represents a relational equation between a change in the pressure loss rate and a change in the impurity purification capacity. That is, Y in Equation 3 represents an impurity purification capacity changed depending on the change in the pressure loss rate.

Next, the air conditioner 100 may calculate a reference value (for example 50%) by which the impurity purification capacity is reduced on the basis of the initial setting value as a filter replacement time (S405).

In this case, the air conditioner 100 may estimate a pressure loss rate at a point of time at which the impurity purification capacity is reduced by the predetermined reference relative to the initial setting value of the filter.

The air conditioner 100 may receive a current state value of the filter detected by the sensor 150 (S407). That is, the air conditioner 100 may check the differential pressure before and after the filter in real time.

The air conditioner 100 may calculate a current impurities pressure loss rate on the basis of the current differential pressure before and after the filter (S409).

The air conditioner 100 may determine whether the filter replacement time arrives by checking whether the current impurity purification capacity is lower than the reference value (S411). The air conditioner 100 may determine that the replacement time of the filter arrives when the current impurity purification capacity is lower than the reference value.

When it is determined that the filter replacement time arrives as a result of the determination, the air conditioner 100 may output a filter replacement notification (S413).

Meanwhile, when it is determined that the filter replacement time does not arrive as a result of the determination of operation S411, the air conditioner 100 may re-perform the operations from operation S407.

Figure 12:
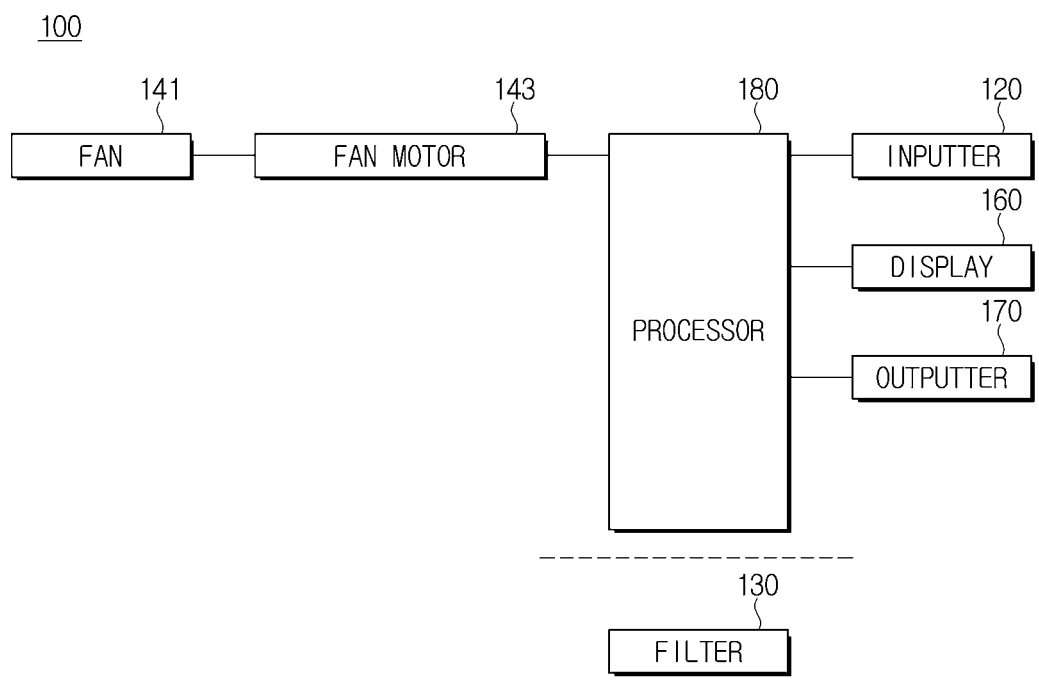
FIG. 12 is a view showing another embodiment of a configuration of the air conditioner.

FIG. 12 is a view showing another embodiment of a configuration of the air conditioner, and a case in which a separate sensor is not included in the air conditioner will be exemplarily described.

Hereinafter, a detailed description of a configuration identical to that of the air conditioner in FIG. 3 will be omitted.

As shown in FIG. 12, an air conditioner 100 may include a main body 110 (see FIG. 1), an inputter 120 provided outside the air conditioner 100 to receive various control commands from a user, a filter 130 for filtering impurities introduced into the main body 110 from the outside, a fan 141 introducing the impurities into the main body 110 through the filter 130, a fan motor 143 for driving the fan 141, a display 160 displaying a filter replacement time notification as text, an outputter 170 outputting the filter replacement time notification as a voice, and a processor 180 determining that the replacement time of the filter arrives when an impurity purification capacity calculated in real time on the basis of the input value applied to the fan motor 143 is lower than a reference value, and providing the filter replacement time notification through the display 160 or the outputter 170.

The reference value may be calculated on the basis of an initial input value applied to the fan motor 143 when the filter 130 is initially operated.

Further, the initial input value may be a current and a voltage applied to the fan motor 143.

The current and the voltage input to the fan motor 143 and output from the fan motor 143 may be directly obtained by the processor 180 side from the current and the voltage applied to the fan motor 143 through the fan motor 143 without the separate sensor 150.

The processor 180 may calculate an initial amount of power consumption of the fan motor 143 on the basis of the initial current and voltage input to the fan motor 143, and may set the calculated initial amount of power consumption of the fan motor 143 and an impurity purification capacity at a point of time at which the initial input value is applied to the fan motor 143 as an initial setting value of the filter 130 when the filter 130 is initially operated.

In this case, the impurity purification capacity refers to performance of the filter 130 filtering impurities of air introduced into the main body 110, and the impurity purification capacity at the time at which the filter is initially operated may be set to 100%.

Further, the processor 180 may estimate the filter replacement time on the basis of the initial setting value of the filter and output the filter replacement notification when the impurity purification capacity calculated in real time on the basis of a current input value applied to the fan motor 143 is lower than the reference value, which is the filter replacement time.

In this case, the initial setting value includes the impurity purification capacity calculated on the basis of the initial input value applied to the fan motor 143 when the filter is initially operated, and thus the initial setting value may be used as a starting point for determining the filter replacement time (for example, an impurity purification capacity of 100% P1 shown in FIG. 9) even at a point of time at which the filter is replaced due to a low impurity purification capacity is determined.

The impurity purification capacity Y may be calculated through Equation 1. In this case, Equation 1 may represent a relational equation between an amount of change in power consumption and a change in the impurity purification capacity. That is, Y in Equation 1 represents an impurity purification capacity changed depending on the amount of change in the power consumption.

The processor 180 may estimate the replacement time of the filter when the impurity purification capacity is lower than the reference value (for example 50%) relative to the initial setting value of the filter.

The present disclosure determines that a filter replacement time arrives on the basis of a physical amount when the filter is initially used, and thus a practical lifetime of the filter can be objectively estimated regardless of kinds of dust, and a reliable filter replacement time can be provided for a user.

The present disclosure has been described in detail with reference to the exemplary embodiments. However, the exemplary embodiments should be considered in a descriptive sense only, and the present disclosure is not limited thereto. It should be clear to those skilled in the art that various modifications and improvements within the scope of the present disclosure may be made.

Simple modifications and alterations of the present disclosure fall within the scope of the present disclosure, and the scope of the present disclosure is defined by the accompanying claims.

The invention claimed is:

1. An air conditioner comprising:
a main body;
a filter configured to filter impurities externally introduced into the main body;
a fan configured to introduce the impurities into the main body through the filter;
a fan motor configured to drive the fan;
a sensor configured to detect a filter state value for determining a state of the filter, wherein an initial state value of the filter includes a current and a voltage input to the fan motor; and
a processor configured to determine a replacement time for notification of replacing the filter when an impurity purification capacity calculated based on the filter state value detected in real time by the sensor is lower than a reference value,
wherein the reference value is calculated on based on the initial state value of the filter detected by the sensor.

2. The air conditioner of claim 1, wherein the processor is further configured to:
calculate an initial amount of power consumption of the fan motor based on an initial current and voltage input to the fan motor, and
set an initial impurity purification capacity at a point of time at which a calculated initial amount of power consumption of the fan motor and the initial state value of the filter are detected as an initial setting value of the filter.

3. The air conditioner of claim 2, wherein:
the impurity purification capacity (Y) is calculated based on $Y=Ax^2+Bx+C$,
x represents a change in a current amount of power consumption relative to the initial setting value of the filter,
A represents whether the impurity purification capacity is increased or decreased corresponding to an increase and a decrease of the change in the current amount of power consumption,
B presents an instantaneous change rate of the impurity purification capacity when the change in the current amount of power consumption is 0, and C represents the impurity purification capacity when the change in the current amount of power consumption is 0.

4. The air conditioner of claim 1, wherein:
the initial state value of the filter is a wind velocity on an outlet side; and
the processor is further configured to:
calculate an air flow based on the wind velocity on the outlet side, and
set the impurity purification capacity at a point of time at which the calculated air flow and the initial state value of the filter are detected as an initial setting value of the filter.

5. The air conditioner of claim 4, wherein:
the impurity purification capacity (Y) is calculated based on $Y=DE+F$,
D represents a ratio of a change in the impurity purification capacity to a change in the air flow,
E represents a current air flow relative to the initial setting value of the filter, and
F represents the impurity purification capacity when the air flow is 0.

6. The air conditioner of claim 1, wherein:
the initial state value of the filter is a differential pressure before and after the filter on a route to which the impurities are introduced.

7. The air conditioner of claim 6, wherein the processor is further configured to:
calculate a pressure loss rate based on the differential pressure before and after the filter, and
set the impurity purification capacity at a point of time at which the calculated pressure loss rate and the initial state value of the filter are detected as an initial setting value of the filter.

8. The air conditioner of claim 7, wherein:
the impurity purification capacity (Y) is calculated based on $Y=GH'$,
G represents a ratio of a change in an impurity purification capacity logarithm value to a change in a pressure loss rate logarithm value,
H represents a current pressure loss rate relative to the initial setting value of the filter, and
I represents the impurity purification capacity when the pressure loss rate logarithm value is 0.

9. The air conditioner of claim 1, wherein the processor is further configured to:
before detecting of a current state value of the filter in real time and after setting an initial setting value, determine the reference value by which the impurity purification capacity is reduced from the initial setting value of the filter as the replacement time.

10. A method of controlling an air conditioner, the method comprising:
detecting, by the air conditioner, an initial state value of a filter through a sensor, the initial state value of the filter including a current and a voltage input to a fan motor;
setting an initial setting value of the filter based on the initial state value of the filter detected by the sensor;
detecting a current state value of the filter through the sensor in real time;
checking whether an impurity purification capacity calculated based on the detected current state value of the filter is lower than a reference value; and
outputting a filter replacement notification by determining a replacement time of the filter when the impurity purification capacity is lower than the reference value as a result of the checking, wherein the reference value is calculated based on the initial state value of the filter detected by the sensor.

11. The method of claim 10, further comprising, before the detecting of a current state value of the filter in real time and after the setting of an initial setting value, determining the reference value by which the impurity purification capacity is reduced from the initial setting value of the filter as a filter replacement time.

12. The method of claim 11, wherein:

the impurity purification capacity (Y) is calculated based on $Y=Ax^2+Bx+C$, x represents a change in a current amount of power consumption in comparison to the initial setting value of the filter, A represents whether the impurity purification capacity is increased or decreased corresponding to an increase and a decrease of the change in the current amount of power consumption, B presents an instantaneous change rate of the impurity purification capacity when the change in the current amount of power consumption is 0, and C represents the impurity purification capacity when the change in the current amount of power consumption is 0.

13. The method of claim 11, wherein the setting of the initial setting value of the filter includes:

calculating an amount of power consumption of the fan motor based on the current and the voltage input to the fan motor; and setting an initial impurity purification capacity at a point of time at which the initial state value of the filter and the calculated amount of power consumption of the fan motor are detected as the initial setting value of the filter.

14. The method of claim 10, wherein:

the initial state value of the filter is a wind velocity on an outlet side; and the setting of the initial setting value of the filter includes:

calculating a wind velocity based on the wind velocity on the outlet side, and setting an initial impurity purification capacity at a point of time at which the calculated wind velocity and the initial state value of the filter are detected as the initial setting value of the filter.

15. The method of claim 14, wherein:

the impurity purification capacity (Y) is calculated based on $Y=DE+F$,

D represents a ratio of a change in the impurity purification capacity to a change in an air flow, E represents a current air flow relative to the initial setting value of the filter, and F represents the impurity purification capacity when the air flow is 0.

16. The method of claim 10, wherein:

the initial state value of the filter is a differential pressure before and after the filter on a route to which impurities are introduced.

17. The method of claim 16, wherein the setting of the initial setting value of the filter includes:

calculating a pressure loss rate based on the differential pressure before and after the filter; and setting the impurity purification capacity at a point of time at which the calculated pressure loss rate and the initial state value of the filter are detected as the initial setting value of the filter.

18. The method of claim 17, wherein:

the impurity purification capacity (Y) is calculated based on $Y=GH^I$,

G represents a ratio of a change in an impurity purification capacity logarithm value to a change in a pressure loss rate logarithm value, H represents a current pressure loss rate relative to the initial setting value of the filter, and I represents the impurity purification capacity when the pressure loss rate logarithm value is 0.

* * * * *